(12) United States Patent
Xu et al.

(10) Patent No.: US 11,681,378 B2
(45) Date of Patent: *Jun. 20, 2023

(54) AUTOMATED KEYBOARD MAPPING FOR VIRTUAL DESKTOPS

(71) Applicant: Citrix Systems, Inc., Fort Lauderdale, FL (US)

(72) Inventors: Wenping Xu, Nanjing (CN); Junying Gao, Nanjing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/315,642

(22) Filed: May 10, 2021

(65) Prior Publication Data

US 2021/0263596 A1  Aug. 26, 2021

Related U.S. Application Data

(63) Continuation of application No. 16/221,849, filed on Dec. 17, 2018, now Pat. No. 11,036,308, which is a
(Continued)

(51) Int. Cl.
*G06F 3/023* (2006.01)
*G06F 11/36* (2006.01)
*G06F 11/34* (2006.01)

(52) U.S. Cl.
CPC ........ *G06F 3/0238* (2013.01); *G06F 11/3457* (2013.01); *G06F 11/3688* (2013.01)

(58) Field of Classification Search
CPC .............. G06F 3/0238; G06F 11/3457; G06F 11/3688; G06F 9/451; G06F 9/452; G06F 11/3664; G06F 11/3684
See application file for complete search history.

(56) References Cited

U.S. PATENT DOCUMENTS 9,081,486 B2   7/2015  He et al.
2010/0318695 A1  12/2010  Xing et al.
(Continued)

FOREIGN PATENT DOCUMENTS

CN   103902056 A   7/2014
CN   105022495 A   11/2015
(Continued)

OTHER PUBLICATIONS

Jul. 6, 2020—U.S. Office Action—U.S. Appl. No. 16/221,849.
(Continued)

*Primary Examiner* — Jennifer N Welch
*Assistant Examiner* — Ashley M Fortino

(57) ABSTRACT

Methods and systems for performing automated keyboard mapping for virtual desktops are described herein. A system may generate a keyboard mapping table containing a plurality of keyboard inputs. The system may simulate a keyboard input locally at the system and using a virtual desktop hosted by a remote desktop platform to generate keyboard simulation outputs in response to a first keyboard input. In response to determining a discrepancy between the keyboard simulation outputs, the system may modify a key value in the keyboard mapping table resulting in a corrected keyboard mapping table, where the key value corresponds to the first keyboard input. In response to receiving a second keyboard input, the system may apply the corrected keyboard mapping table to display a keyboard output at the virtual desktop hosted by the remote desktop platform, where the second keyboard input has the same key value as the first keyboard input.

20 Claims, 12 Drawing Sheets

700

Related U.S. Application Data continuation of application No. PCT/CN2018/114749, filed on Nov. 9, 2018.

(56) References Cited

U.S. PATENT DOCUMENTS

| | | | |
|---|---|---|---|
| 2011/0141124 A1 | 6/2011 | Halls et al. | |
| 2014/0047374 A1* | 2/2014 | He | G06F 3/04886 |
| | | | 715/773 |
| 2014/0189576 A1* | 7/2014 | Carmi | G06V 10/752 |
| | | | 715/781 |
| 2015/0347270 A1* | 12/2015 | Cheng | G06F 3/03 |
| | | | 714/38.1 |
| 2017/0195356 A1* | 7/2017 | Turgeman | H04L 63/08 |
| 2018/0267885 A1 | 9/2018 | Budurean et al. | |
| 2020/0142808 A1* | 5/2020 | Damen | G06F 11/3668 |

FOREIGN PATENT DOCUMENTS

| | | |
|---|---|---|
| WO | 2012163216 A1 | 12/2012 |
| WO | 2017091411 A1 | 6/2017 |

OTHER PUBLICATIONS

Nov. 3, 2020—U.S. Final Office Action—U.S. Appl. No. 16/221,849.
Feb. 16, 2021—U.S. Notice of Allowance—U.S. Appl. No. 16/221,849.
May 20, 2021—(WO) International Search Report—PCT/CN2018/114749.
May 20, 2022 Extended European Search Report App No. 18939431.5.
Oct. 6, 2022 (AU) First Examination Report—App 2018448950.
Jul. 14, 2022—(JP) Office Action—App No. 2021-524459.

\* cited by examiner

| OS | Browser | Keyboard | Key | ICA Value |
|---|---|---|---|---|
| Windows 10 | Chrome | Japanese | a | (97, character) |

1015

| OS | Browser | Keyboard | Key | ICA Value |
|---|---|---|---|---|
| Windows 10 | Chrome | Japanese | a | (Error, character) |

AUTOMATED KEYBOARD MAPPING FOR VIRTUAL DESKTOPS

CROSS-REFERENCE TO RELATED APPLICATIONS

The present application is a continuation of and claims priority to U.S. Ser. No. 16/221,849, filed on Dec. 17, 2018, and entitled "Automated Keyboard Mapping for Virtual Desktops," which claims priority to International Application No. PCT/CN2018/114749, filed Nov. 9, 2018, and entitled, "Automated Keyboard Mapping for Virtual Desktops," both of which are hereby incorporated by reference as to their entirety.

FIELD

Aspects described herein generally relate to enhanced processing systems for performing automated keyboard mapping for virtual desktops. In particular, one or more aspects of the disclosure relate to comparing a local keyboard output with a keyboard output at a virtual desktop, and performing automatic correction in a keyboard mapping table if the outputs do not match.

BACKGROUND

Many organizations and individuals rely on virtual desktops to compensate for limited screen area at a computing device as well as to facilitate remote access to secure networks. Thus, it may be important to ensure that a user experience with a virtual desktop resembles a typical user experience at a computing device.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards systems and methods for performing automated keyboard mapping for virtual desktops.

In accordance with one or more embodiments of the disclosure, a system comprising at least one processor and a memory, may generate a keyboard mapping table containing a plurality of keyboard inputs. The system may simulate a keyboard input locally at the system and using a virtual desktop hosted by a remote desktop platform to generate keyboard simulation outputs in response to a first keyboard input. In response to determining a discrepancy between the keyboard simulation outputs, the system may modify a key value in the keyboard mapping table resulting in a corrected keyboard mapping table, where the key value corresponds to the first keyboard input. In response to receiving a second keyboard input, the system may apply the corrected keyboard mapping table to display a keyboard output at the virtual desktop hosted by the remote desktop platform, where the second keyboard input has the same key value as the first keyboard input.

In one or more instances, the system may receive inputs corresponding to each of the plurality of keyboard inputs. The inputs may be information corresponding to one or more of: an operating system, a keyboard mode, and a browser. After receiving the inputs, the system may install the inputs, which may create a keyboard mapping test environment.

In one or more instances, the first keyboard input may be a multiple keystroke command. In one or more instances, the system may automatically compile a keyboard mapping test automation script using the keyboard mapping table, which may cause the system to simulate each of the plurality of keyboard inputs contained in the keyboard mapping table.

In one or more instances, the keyboard simulation outputs may be presented on a display of the system and the virtual desktop hosted by the remote desktop platform, respectively, in response to the first keyboard input. In one or more instances, a keyboard mapping test automation script may cause the system to capture screenshots of the system and the virtual desktop respectively, and the screenshots may contain the keyboard simulation outputs.

In one or more instances, the system may compare the screenshots to determine whether the keyboard simulation output displayed at the system and the virtual desktop match. In one or more instances, the keyboard mapping table may include key values corresponding to keyboard inputs, and each key value may be an independent computing architecture (ICA) key value.

In one or more instances, in response to determining that the keyboard simulation outputs are equivalent, the system may record that the key value is correct by marking an ICA value in the keyboard mapping table that corresponds to the first keyboard input. In one or more instances, the keyboard input may correspond to one of: a single character and a keyboard command.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards a method for automatically comparing outputs, displayed or otherwise processed, corresponding to keyboard inputs and determining that one of more of the outputs are incorrectly mapped to the corresponding keyboard inputs in the context of virtual desktops and/or applications. The method builds test cases for specified combinations of operating systems, browsers, keyboard types, or the like, which are defined in a keyboard mapping table. The method compares a simulated keyboard output generated on a local machine with an output on a virtual desktop/application using text recognition. If the simulated keyboard outputs do not match, the keyboard mapping is presumed incorrect, and automatic correction in a keyboard mapping table is performed.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect connecting and coupling.

Computing Architecture

Figure 1:
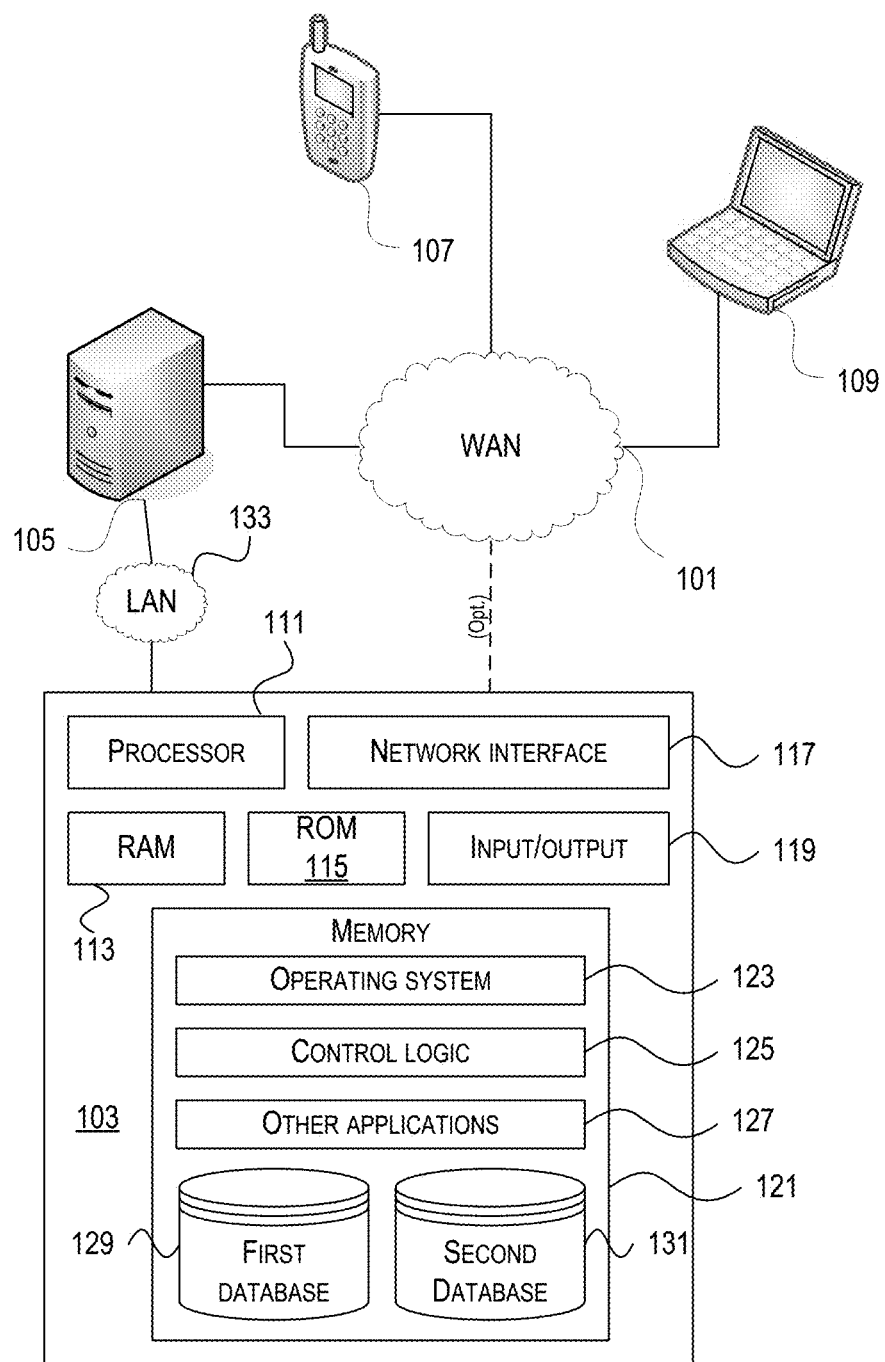
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
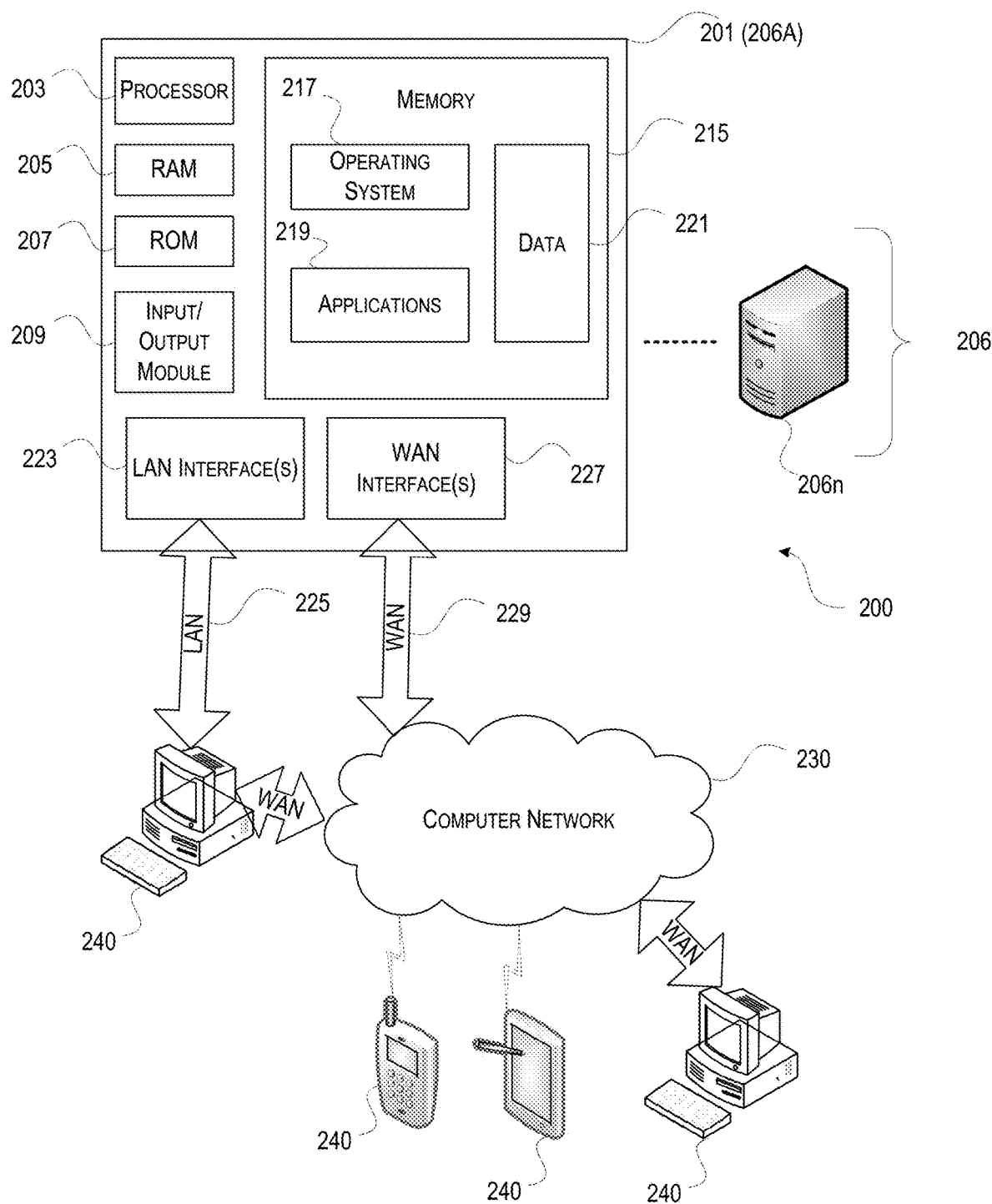
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
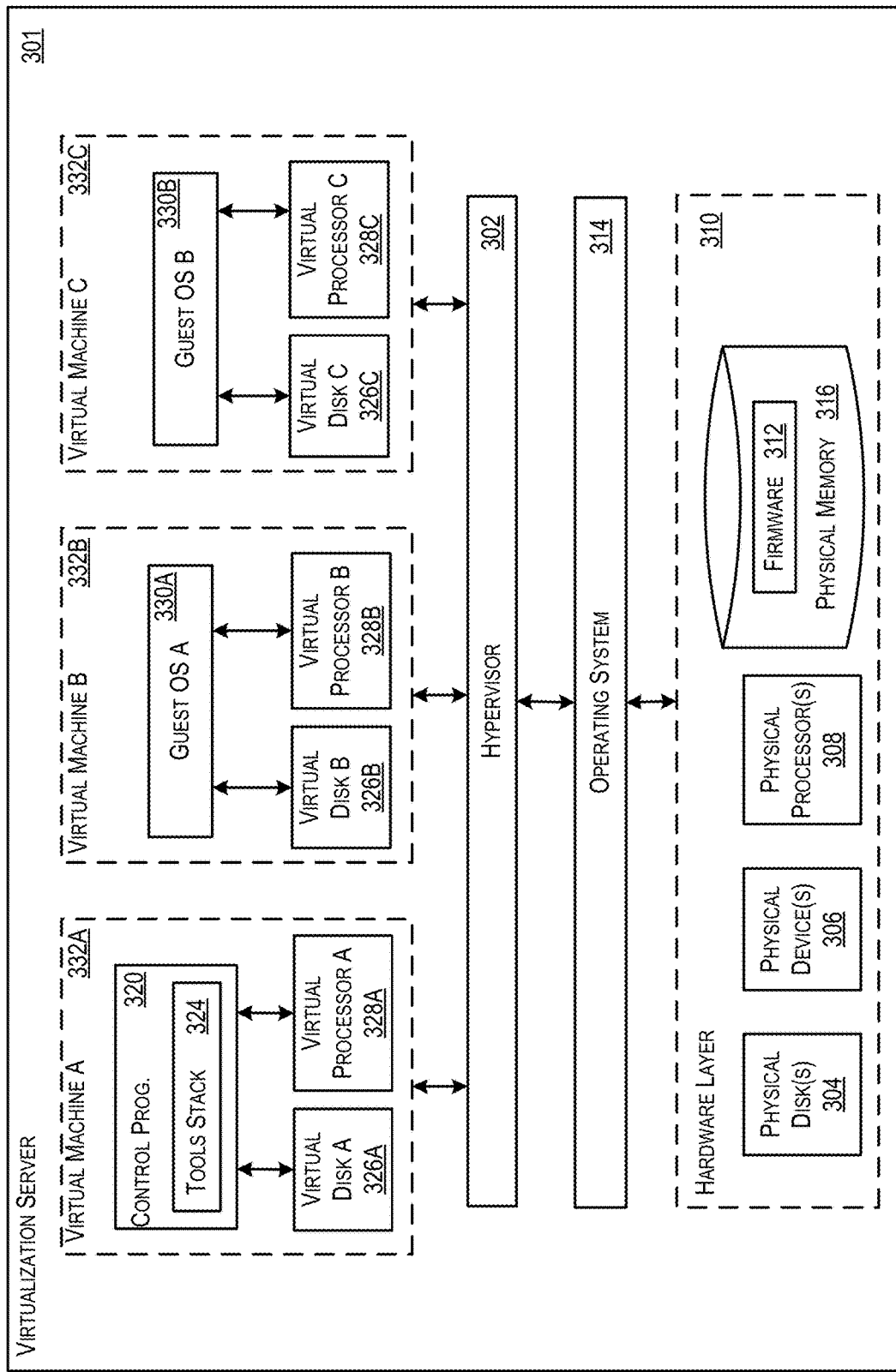
FIG. 3 depicts an illustrative virtualized (hypervisor) system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e g, many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; the XENPROJECT hypervisor, an open source product whose development is overseen by the open source XenProject.org community; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the XENSERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
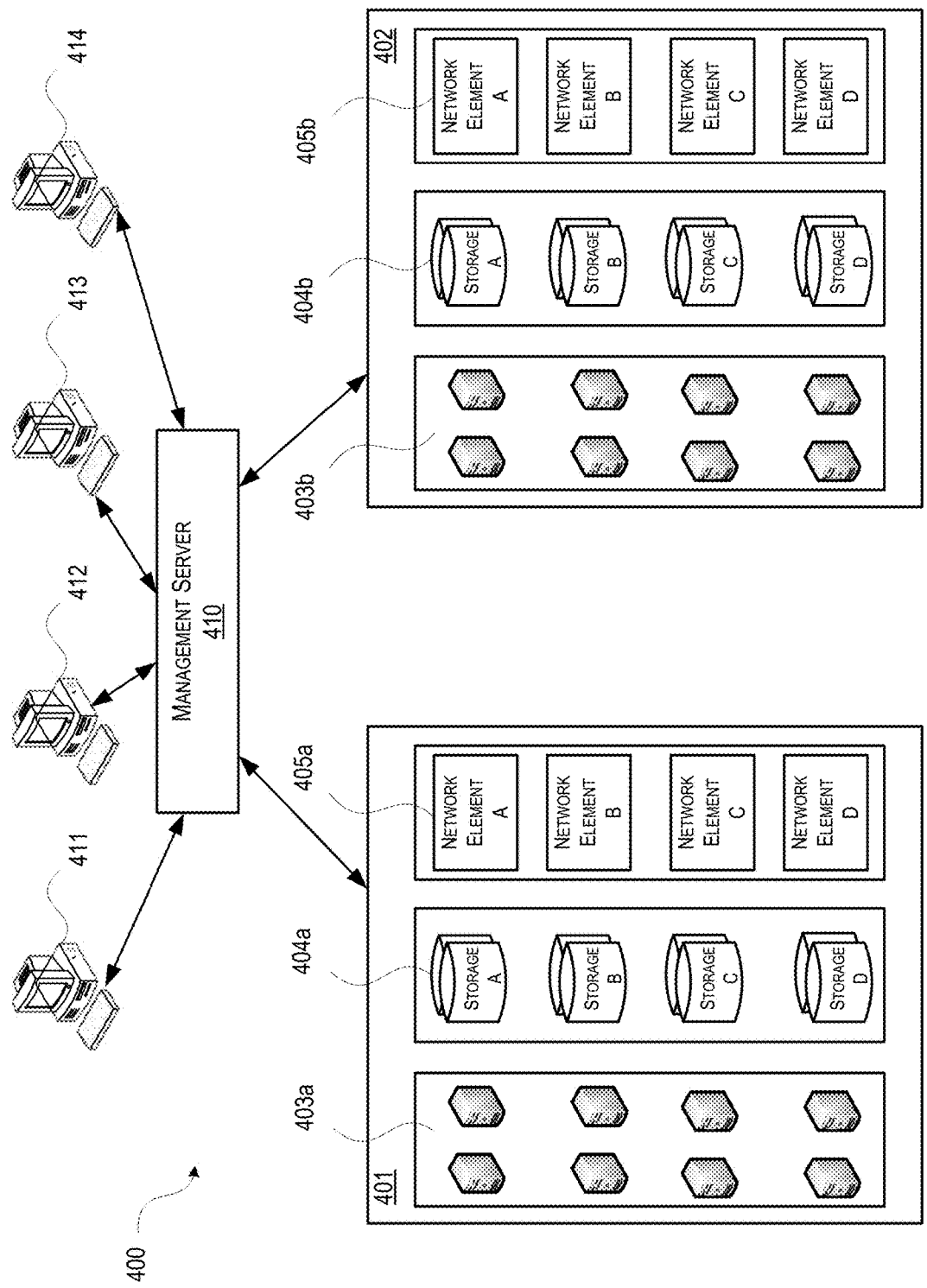
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network elements 405a-405b (generally referred herein as "network resources 405")) of the cloud system.

Management server 410 may be implemented on one or more physical servers. The management server 410 may run, for example, CLOUDPLATFORM by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
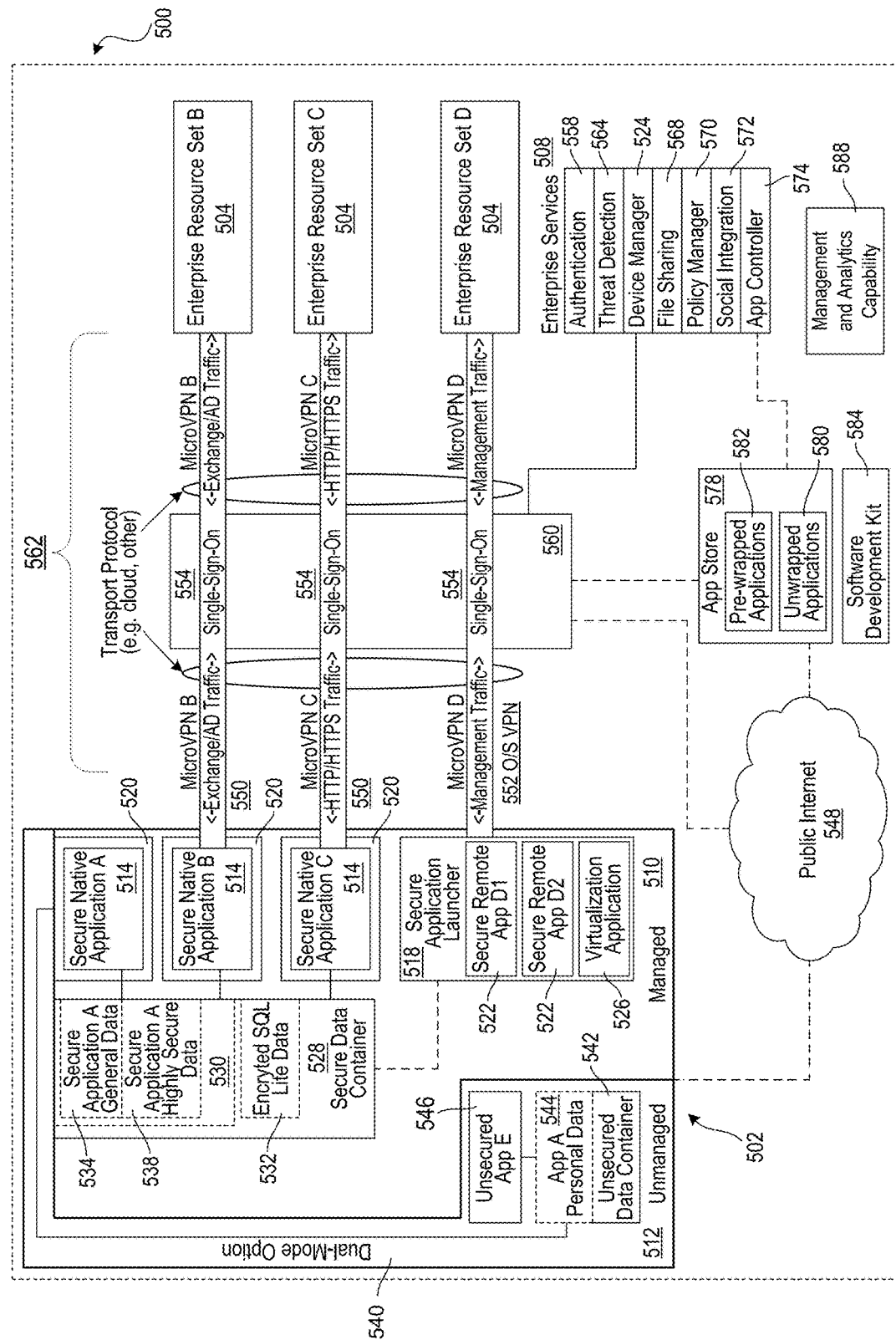
FIG. 5 depicts an illustrative enterprise mobility management system.

FIG. 5 represents an enterprise mobility technical architecture 500 for use in a "Bring Your Own Device" (BYOD) environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to the user. The user may utilize the mobile device 502 for business use only or for business and personal use. The mobile device 502 may run an iOS operating system, an Android operating system, or the like. The enterprise may choose to implement policies to manage the mobile device 502. The policies may be implemented through a firewall or gateway in such a way that the mobile device 502 may be identified, secured or security verified, and provided selective or full access to the enterprise resources (e.g., 504 and 508.) The policies may be mobile device management policies, mobile application management policies, mobile data management policies, or some combination of mobile device, application, and data management policies. A mobile device 502 that is managed through the application of mobile device management policies may be referred to as an enrolled device.

In some embodiments, the operating system of the mobile device 502 may be separated into a managed partition 510 and an unmanaged partition 512. The managed partition 510 may have policies applied to it to secure the applications running on and data stored in the managed partition 510. The applications running on the managed partition 510 may be secure applications. In other embodiments, all applications may execute in accordance with a set of one or more policy files received separate from the application, and which define one or more security parameters, features, resource restrictions, and/or other access controls that are enforced by the mobile device management system when that application is executing on the mobile device 502. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple applications as described herein (virtual partition). Stated differently, by enforcing policies on managed applications, those applications may be restricted to only be able to communicate with other managed applications and trusted enterprise resources, thereby creating a virtual partition that is not accessible by unmanaged applications and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application 514 is executed on the mobile device 502. The secure application wrapper 520 may include meta-data that points the secure native application 514 running on the mobile device 502 to the resources hosted at the enterprise (e.g., 504 and 508) that the secure native application 514 may require to complete the task requested upon execution of the secure native application 514. The secure remote applications 522 executed by a secure application launcher 518 may be executed within the secure application launcher 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application 526 may record user interactions associated with a graphical user interface (GUI) and communicate them to a server application where the server application will use the user interaction data as an input to the application operating on the server. In such an arrangement, an enterprise may elect to maintain the application on the server side as well as data, files, etc. associated with the application. While an enterprise may elect to "mobilize" some applications in accordance with the principles herein by securing them for deployment on the mobile device 502, this arrangement may also be elected for certain applications. For example, while some applications may be secured for use on the mobile device 502, others might not be prepared or appropriate for deployment on the mobile device 502 so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device 502 so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device 502 as well as a virtualization application 526 to allow access to applications that are deemed more properly operated on the server side. In an embodiment, the virtualization application 526 may store some data, files, etc. on the mobile device 502 in one of the secure storage locations. An enterprise, for example, may elect to allow certain information to be stored on the mobile device 502 while not permitting other information.

In connection with the virtualization application 526, as described herein, the mobile device 502 may have a virtualization application 526 that is designed to present GUIs and then record user interactions with the GUI. The virtualization application 526 may communicate the user interactions to the server side to be used by the server side application as user interactions with the application. In response, the application on the server side may transmit back to the mobile device 502 a new GUI. For example, the new GUI may be a static page, a dynamic page, an animation, or the like, thereby providing access to remotely located resources.

The secure applications 514 may access data stored in a secure data container 528 in the managed partition 510 of the mobile device 502. The data secured in the secure data container may be accessed by the secure native applications 514, secure remote applications 522 executed by a secure application launcher 518, virtualization applications 526 executed by a secure application launcher 518, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as Advanced Encryption Standard (AES) 128-bit encryption or the like, while highly secure data 538 may use a very strong form of encryption such as AES 256-bit encryption. Data stored in the secure data container 528 may be deleted from the mobile device 502 upon receipt of a command from the device manager 524. The secure applications (e.g., 514, 522, and 526) may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 546 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device 502 selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device 502 may connect to enterprise resources 504 and enterprise services 508 at an enterprise, to the public Internet 548, and the like. The mobile device 502 may connect to enterprise resources 504 and enterprise services 508 through virtual private network connections. The virtual private network connections, also referred to as microVPN or application-specific VPN, may be specific to particular applications (as illustrated by microVPNs 550, particular devices, particular secured areas on the mobile device (as illustrated by O/S VPN 552), and the like. For example, each of the wrapped applications in the secured area of the mobile device 502 may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway 560 may also re-route traffic from the mobile device 502 to the public Internet 548, enabling the mobile device 502 to access publicly available and unsecured applications that run on the public Internet 548. The mobile device 502 may connect to the access gateway 560 via a transport protocol or network 562. The transport network 562 may use one or more transport protocols and may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud-based resources, and the like. The enterprise resources 504 may be accessed by the mobile device 502 directly or through the access gateway 560. The enterprise resources 504 may be accessed by the mobile device 502 via the transport network 562.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services, and the like. Authentication services 558 may use certificates. The certificates may be stored on the mobile device 502, by the enterprise resources 504, and the like. The certificates stored on the mobile device 502 may be stored in an encrypted location on the mobile device 502, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store 578 may be provided with an intuitive and easy to use user interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
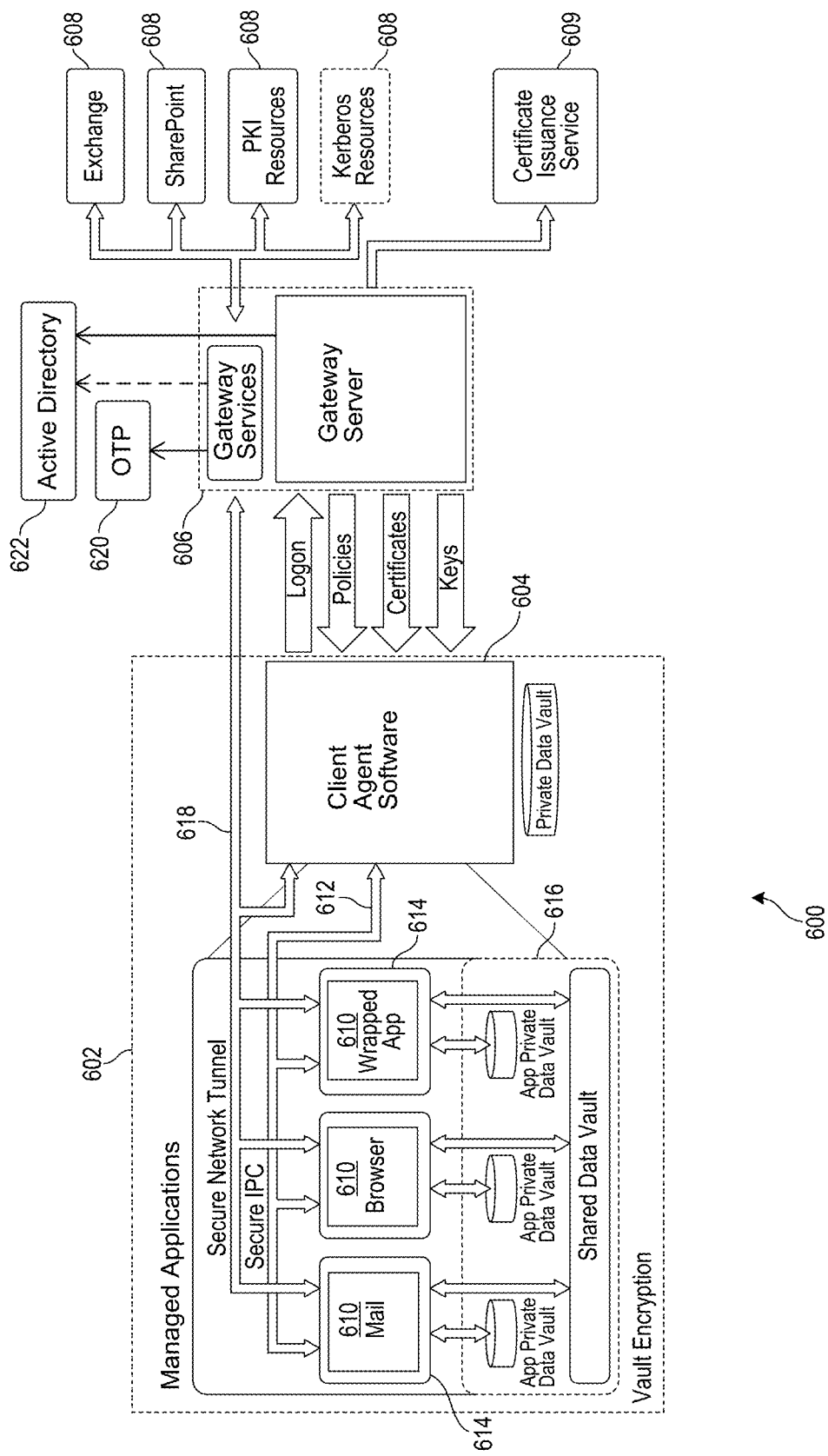
FIG. 6 depicts another illustrative enterprise mobility management system.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604, which interacts with gateway server 606 (which includes Access Gateway and application controller functionality) to access various enterprise resources 608 and services 609 such as Exchange, Sharepoint, public-key infrastructure (PKI) Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the High-Definition User Experience (HDX)/ICA display remoting protocol. The client agent 604 also supports the installation and management of native applications on the mobile device 602, such as native iOS or Android applications. For example, the managed applications 610 (mail, browser, wrapped application) shown in the figure above are all native applications that execute locally on the mobile device 602. Client agent 604 and application management framework of this architecture act to provide policy driven management capabilities and features such as connectivity and SSO (single sign on) to enterprise resources/services 608. The client agent 604 handles primary user authentication to the enterprise, normally to Access Gateway (AG) 606 with SSO to other gateway server components. The client agent 604 obtains policies from gateway server 606 to control the behavior of the managed applications 610 on the mobile device 602.

The Secure InterProcess Communication (IPC) links 612 between the native applications 610 and client agent 604 represent a management channel, which may allow a client agent to supply policies to be enforced by the application management framework 614 "wrapping" each application. The IPC channel 612 may also allow client agent 604 to supply credential and authentication information that enables connectivity and SSO to enterprise resources 608. Finally, the IPC channel 612 may allow the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 may request policy information from client agent 604, which in turn may request it from gateway server 606. The application management framework 614 may request authentication, and client agent 604 may log into the gateway services part of gateway server 606 (also known as NETSCALER ACCESS GATEWAY). Client agent 604 may also call supporting services on gateway server 606, which may produce input material to derive encryption keys for the local data vaults 616, or may provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel 612 and obtain the policy for that application. The application management framework 614 may enforce relevant portions of the policy that apply locally, such as the client agent login dependencies and some of the containment policies that restrict how local OS services may be used, or how they may interact with the managed application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The application management framework 614 may be responsible for orchestrating the network access on behalf of each managed application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application 610 may use a special background network access mechanism that allows it to access an Exchange server 608 over an extended period of time without requiring a full AG logon. The Browser application 610 may use multiple private data vaults 616 to segregate different kinds of data.

This architecture may support the incorporation of various other security features. For example, gateway server 606 (including its gateway services) in some cases may not need to validate active directory (AD) passwords. It can be left to the discretion of an enterprise whether an AD password may be used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password or biometric validation. If or when data is stored locally on the mobile device 602 in the secure container 616, it may be preferred that a minimum of AES 256 encryption algorithm be utilized.

Other secure container features may also be implemented. For example, a logging feature may be included, wherein security events happening inside a managed application 610 may be logged and reported to the backend. Data wiping may be supported, such as if or when the managed application 610 detects tampering, associated encryption keys may be written over with random data, leaving no hint on the file system that user data was destroyed. Screenshot protection may be another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the mobile device 602 is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, if or when a managed application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature may relate to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text may be sent to the user with an OTP 620. In some cases, this may be implemented only for online use, with a prompt being a single field.

An offline password may be implemented for offline authentication for those managed applications 610 for which offline use is permitted via enterprise policy. For example, an enterprise may want StoreFront to be accessed in this manner In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature may relate to the enablement of a client side certificate for certain applications 610 as secondary credentials (for the purpose of accessing PKI protected web resources via the application management framework micro VPN feature). For example, a managed application 610 may utilize such a certificate. In this case, certificate-based authentication using ActiveSync protocol may be supported, wherein a certificate from the client agent 604 may be retrieved by gateway server 606 and used in a keychain. Each managed application 610 may have one associated client certificate, identified by a label that is defined in gateway server 606.

Gateway server 606 may interact with an enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PKI protected network resources. More than one certificate may be supported, such as to match various levels of security and/or separation requirements. The certificates may be used by the Mail and Browser managed applications 610, and ultimately by arbitrary wrapped applications 610 (provided those applications use web service style communication patterns where it is reasonable for the application management framework to mediate HTTPS requests).

Application management client certificate support on iOS may rely on importing a public-key cryptography standards (PKCS) 12 BLOB (Binary Large Object) into the iOS keychain in each managed application 610 for each period of use. Application management framework client certificate support may use a HTTPS implementation with private in-memory key storage. The client certificate may not be present in the iOS keychain and may not be persisted except potentially in "online-only" data value that is strongly protected.

Mutual SSL or TLS may also be implemented to provide additional security by requiring that a mobile device 602 is authenticated to the enterprise, and vice versa. Virtual smart cards for authentication to gateway server 606 may also be implemented.

Both limited and full Kerberos support may be additional features. The full support feature relates to an ability to do full Kerberos login to Active Directory (AD) 622, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when HTTP (but not HTTPS) connections are proxied in VPN and MicroVPN mode.

Another feature may relate to application container locking and wiping, which may automatically occur upon jailbreak or rooting detections, and occur as a pushed command from administration console, and may include a remote wipe functionality even when a managed application 610 is not running.

A multi-site architecture or configuration of enterprise application store and an application controller may be supported that allows users to be serviced from one of several different locations in case of failure.

In some cases, managed applications 610 may be allowed to access a certificate and private key via an API (for example, OpenSSL). Trusted managed applications 610 of an enterprise may be allowed to perform specific Public Key operations with an application's client certificate and private key. Various use cases may be identified and treated accordingly, such as if or when an application behaves like a browser and no certificate access is required, if or when an application reads a certificate for "who am I," if or when an application uses the certificate to build a secure session token, and if or when an application uses private keys for digital signing of important data (e.g. transaction log) or for temporary data encryption.

Automated Keyboard Mapping for Virtual Desktops

Figure 7A:
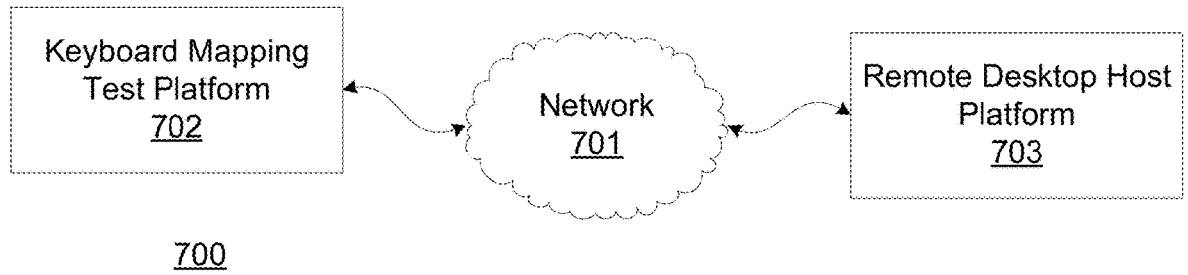
FIGS. 7A-7B depict an illustrative computing environment for performing automated keyboard mapping for virtual desktops in accordance with one or more example embodiments.
Figure 7B:
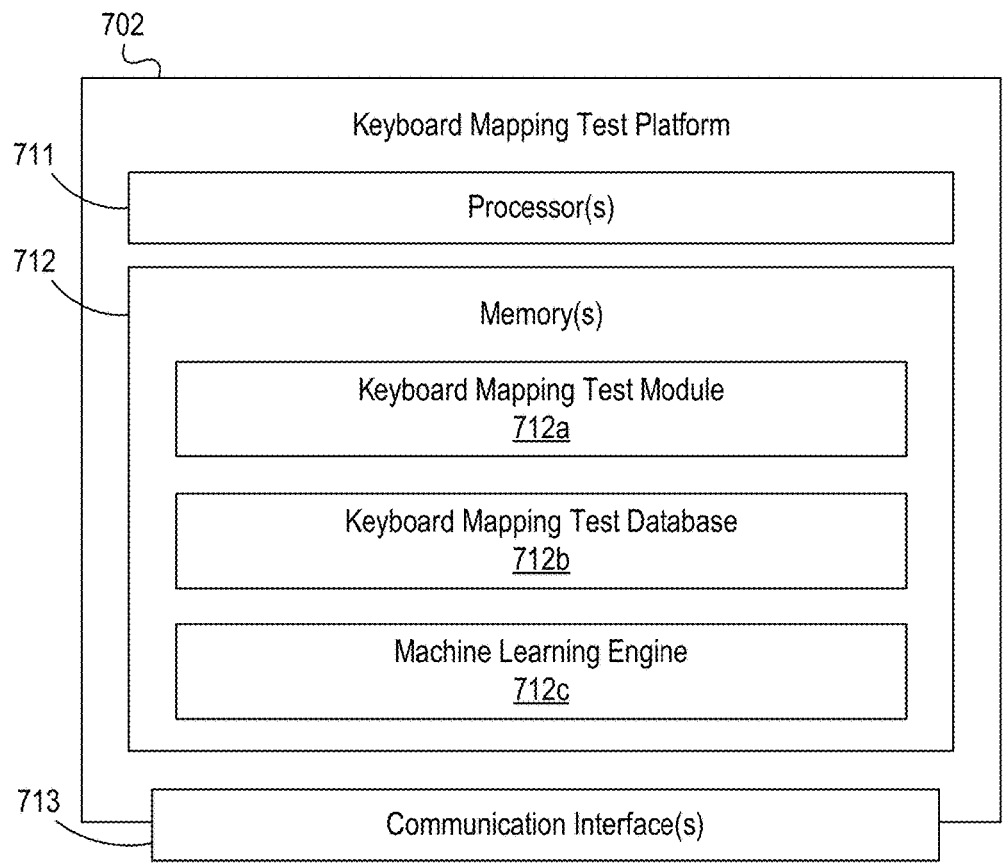

FIGS. 7A and 7B depict an illustrative computing environment configured to perform automated keyboard mapping for virtual desktops in accordance with one or more example embodiments. Referring to FIG. 7A, computing environment 700 may include one or more computer systems. For example, computing environment 700 may include a keyboard mapping test platform 702 and a remote desktop host platform 703.

As illustrated in greater detail below, keyboard mapping test platform 702 may include one or more computing devices configured to perform one or more of the functions described herein. For example, keyboard mapping test platform 702 may include one or more computers (e.g., laptop computers, desktop computers, servers, server blades, or the like). In one or more instances, the keyboard mapping test platform 702 may be a personal computing device (e.g., mobile phone, tablet, laptop computer, desktop computer, or the like). In some instances, the keyboard mapping test platform 702 may generate and implement a keyboard mapping test automation script to verify keyboard mapping in one or more test scenarios, and may cause automated correction of any keyboard mapping determined to be incorrect.

Remote desktop host platform 703 may be a computer system that includes one or more computing devices and/or other computer components (e.g., processors, memories, communication interfaces). In one or more instances, remote desktop host platform 703 correspond to one or more servers configured to host virtual desktops/applications that may be accessed by the keyboard mapping test platform 702. In addition, remote desktop host platform 703 may be configured to implement the keyboard mapping test automation script to cause outputs corresponding to the one or more test scenarios run by the keyboard mapping test platform 702.

Computing environment 700 may also include one or more networks, which may interconnect keyboard mapping test platform 702 and remote desktop host platform 703. For example, computing environment 700 may include a wired or wireless network 701 (which may e.g., interconnect keyboard mapping test platform 702 and remote desktop host platform 703).

In one or more arrangements, keyboard mapping test platform 702, remote desktop host platform 703, and/or the other systems included in computing environment 700 may be any type of computing device capable of receiving a user interface (e.g., browser interface, virtual desktop interface, or the like), receiving input via the user interface, and communicating the received input to one or more other computing devices. For example, keyboard mapping test platform 702, remote desktop host platform 703, and/or the other systems included in computing environment 700 may in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of keyboard mapping test platform 702 and remote desktop host platform 703 may, in some instances, be special purpose computing devices configured to perform specific functions.

Referring to FIG. 7B, keyboard mapping test platform 702 may include one or more processors 711, memory 712, and communication interface 713. A data bus may interconnect processor 711, memory 712, and communication interface 713. Communication interface 713 may be a network interface configured to support communication between the keyboard mapping test platform 702 and one or more networks (e.g., network 701, or the like). Memory 712 may include one or more program modules having instructions that when executed by processor 711 cause keyboard mapping test platform 702 to perform one or more functions described herein and/or access one or more databases that may store and/or otherwise maintain information which may be used by such program modules and/or processor 711. In some instances, the one or more program modules and/or databases may be stored by and/or maintained in different memory units of keyboard mapping test platform 702 and/or by different computing devices that may form and/or otherwise make up keyboard mapping test platform 702. For example, memory 712 may have, host, store, and/or include keyboard mapping test module 712a, a keyboard mapping test database 712b, and a machine learning engine 712c. Keyboard mapping test module 712a may have instructions that direct and/or cause keyboard mapping test platform 702 to execute advanced techniques for testing and correcting keyboard mapping tables (e.g., by generating keyboard outputs locally and at a virtual desktop, comparing the outputs of platforms 702 and 703, and automatically correcting inconsistencies of the outputs of the platforms 702 and 703), as discussed in greater detail below. The keyboard mapping test database 712b may store information used by keyboard mapping test module 712a and/or keyboard mapping test platform 702 in correcting keyboard mapping and/or in performing other functions. Machine learning engine 712c may have instructions that direct and/or cause the keyboard mapping test platform 702 to perform a comparison of local and virtual desktop keyboard outputs and to set, define, and/or iteratively refine optimization rules and/or other parameters used by the keyboard mapping test platform 702 and/or other systems in computing environment 700. In one or more instances, in refining the optimization rules, the machine learning engine 712c may cause the keyboard mapping test platform 702 to refine machine learning algorithms and datasets that may be used to compare the local and virtual desktop keyboard outputs.

Figure 8A:
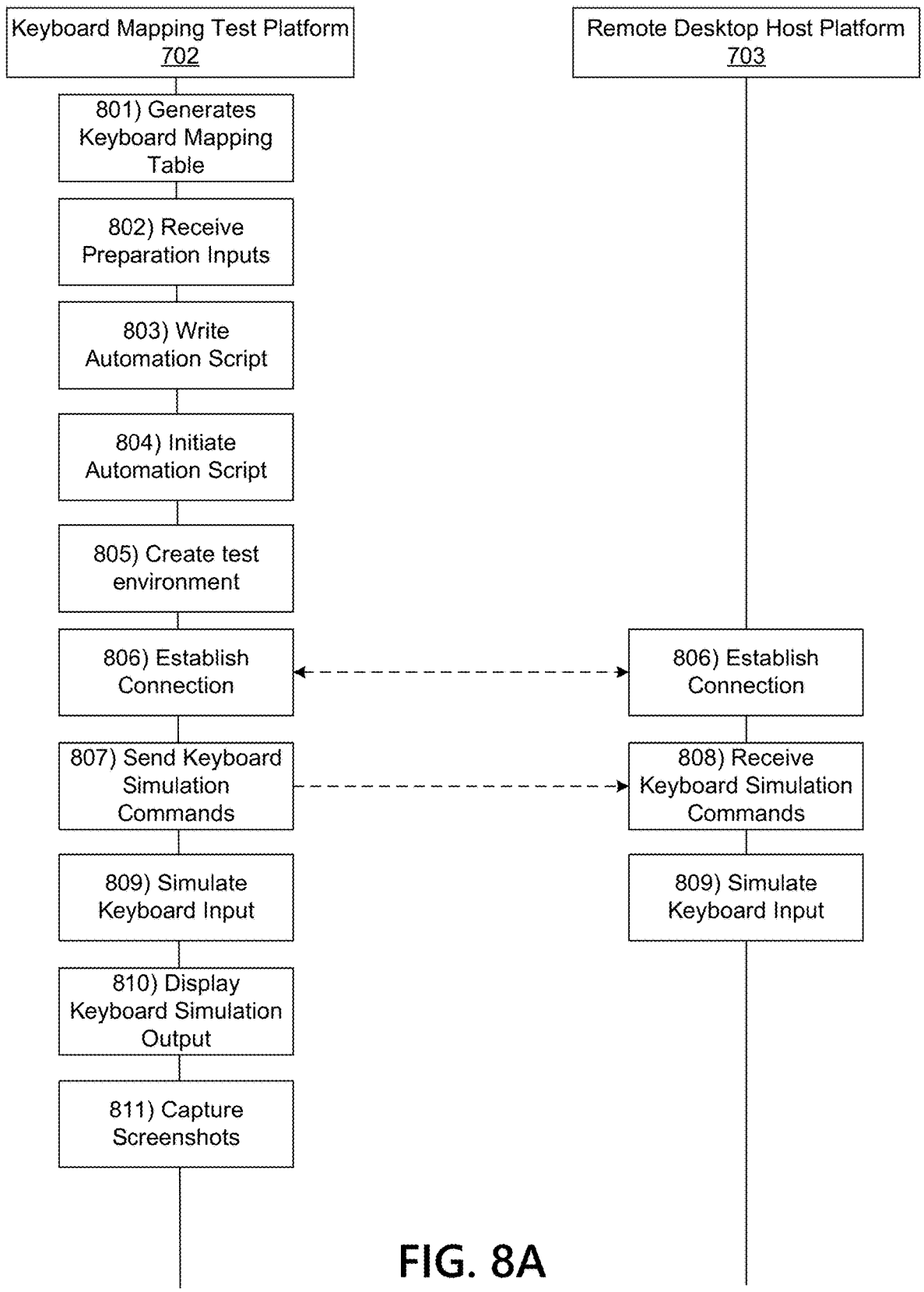
FIGS. 8A-8B depict an illustrative event sequence for performing automated keyboard mapping for virtual desktops in accordance with one or more example embodiments.
Figure 8B:
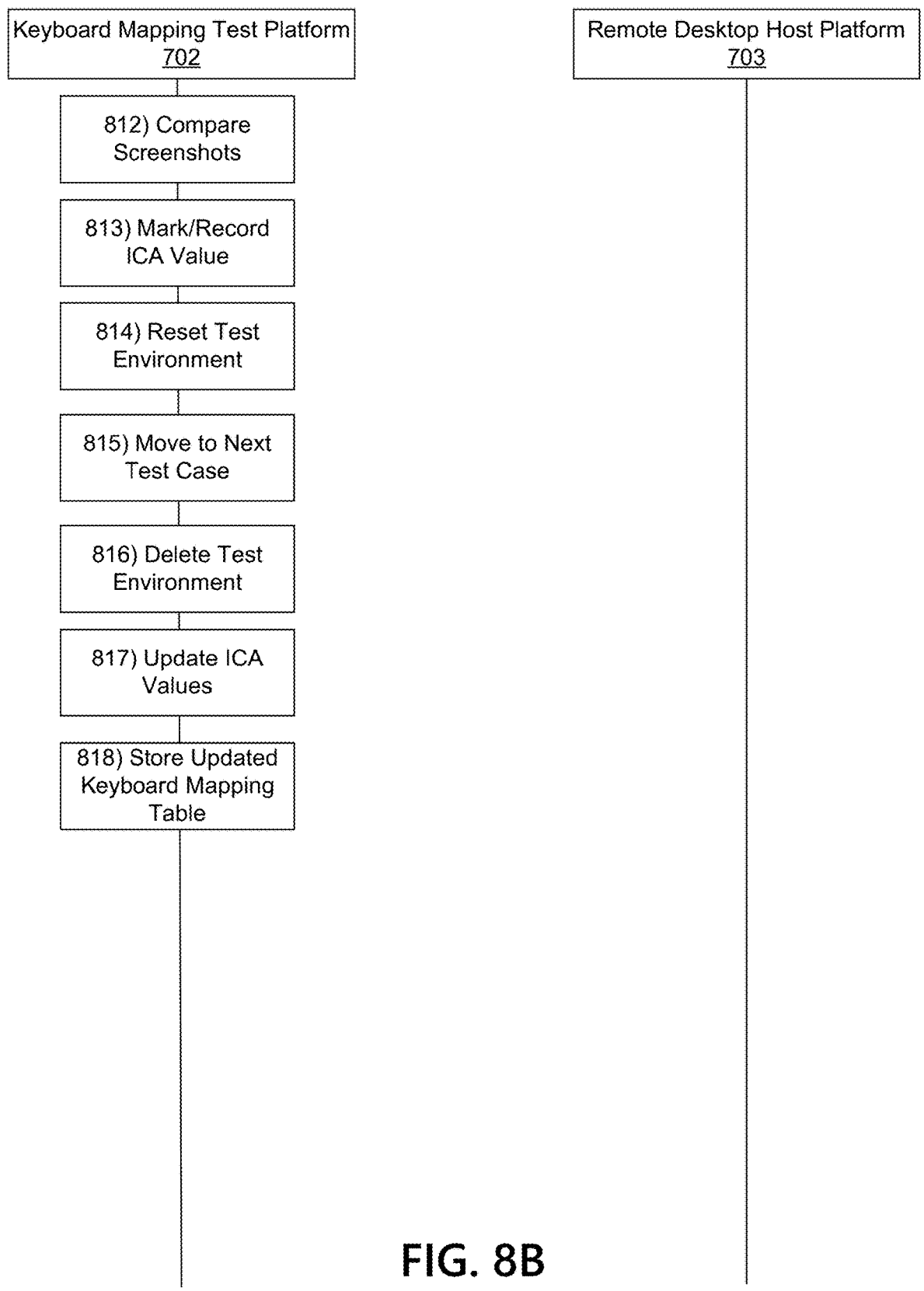
Figures 10A, 10B:
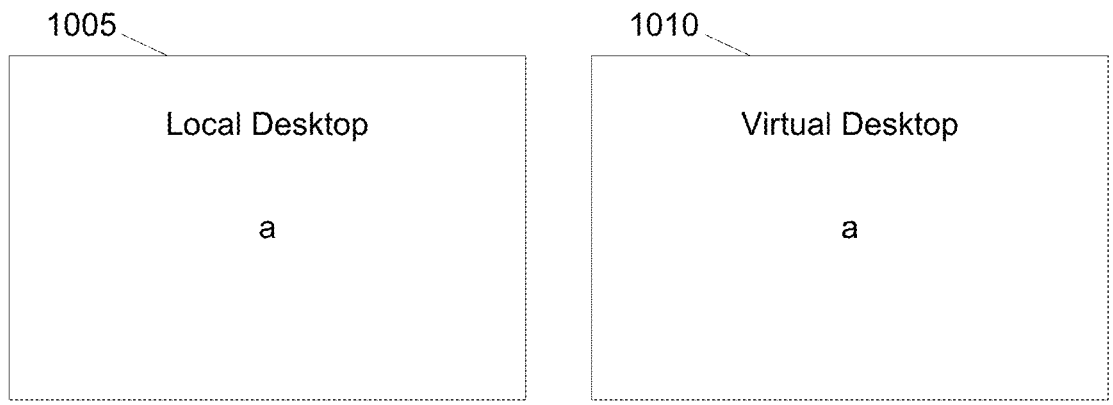
FIGS. 10A-10B depict graphical user interfaces and a corresponding keyboard mapping table associated with performance of automated keyboard mapping for virtual desktops.

FIGS. 8A-8B depict an illustrative event sequence for deploying an enhanced processing system that performs automated keyboard mapping for virtual desktops in accordance with one or more example embodiments. For convenience, steps 801-818 are shown across FIGS. 8A-8B. However, it should be understood that steps 801-818 represent a single event sequence (e.g., step 812 in FIG. 8B may follow step 811 in FIG. 8A). Referring to FIG. 8A, at step 801, the keyboard mapping test platform 702 may generate a keyboard mapping table. In one or more instances, the keyboard mapping table may be a means for mapping keyboard input values to keyboard output values for various operating conditions. In one or more instances, in generating the keyboard mapping table, the keyboard mapping test platform 702 may compile a table that includes an operating system type, a browser type, a keyboard mode (e.g., Chinese, Japanese, United States, or the like), a keyboard input, or the like as inputs. Although this disclosure primarily refers to the keyboard input as a single key input (e.g. a single letter), it should be understood that this disclosure applies to multi-key combinations, commands, or the like in addition to individual keys. In these instances, the keyboard mapping test platform 702 may include an output of the table that corresponds to an independent computing architecture (ICA) value corresponding with the inputs. In generating the keyboard mapping table, the keyboard mapping test platform 702 may generate a table similar to keyboard mapping table 1015, which is shown in FIG. 10B. The keyboard mapping table 1015 shows when the keyboard mapping test platform 702 is running WINDOWS™ 10 by MICROSOFT, using CHROME™ by GOOGLE as a browser, and using a Japanese keyboard, if the "a" key is pressed on a keyboard corresponding to the keyboard mapping test platform 702, an ICA value of 97 should be output to cause display of "a" in the local browser and/or a virtual desktop running at the keyboard mapping test platform 702. In some instances, the keyboard mapping table may correspond to more than one row of inputs and corresponding outputs. For example, the keyboard mapping table may correspond to all key input scenarios to be tested. In one or more instances, the keyboard mapping test platform 702 may generate the keyboard mapping table based on user input received. Additionally or alternatively, the keyboard mapping test platform 702 may automatically generate the keyboard mapping table based on potential key input scenarios. For example, if CHROME™ by GOOGLE and INTERNET EXPLORER™ by MICROSOFT are both installed at the keyboard mapping test platform 702, the keyboard mapping test platform 702 may automatically generate a keyboard mapping table that includes key input scenarios corresponding to both browsers.

At step 802, the keyboard mapping test platform 702 may receive one or more inputs such as software components (operating systems, browsers, keyboard modes, or the like) or information (information identifying the operating systems, browsers, keyboard modes, or the like), which should be installed to configure the keyboard mapping test platform 702 to test various keyboard input scenarios. In one or more instances, the one or more inputs may correspond to the keyboard mapping table generated at step 801. For example the one or more inputs may be information about software components such as operating systems, browsers, or the like installed at the keyboard mapping test platform 702 to simulate a keyboard input under conditions specified in the keyboard mapping table. In one or more instances, the one or more inputs may be the software components themselves. In one or more instances, the keyboard mapping test platform 702 may automatically retrieve the one or more inputs based on the keyboard mapping table. In one or more instances, the keyboard mapping test platform may retrieve the one or more inputs from the remote desktop host platform 703. Additionally or alternatively, the keyboard mapping test platform 702 may receive the one or more inputs as user inputs.

At step 803, the keyboard mapping test platform 702 may generate a keyboard mapping test automation script. In one or more instances, the keyboard mapping test platform 702 may generate the keyboard mapping test automation script by accessing the keyboard mapping table generated at step 801, an internet protocol corresponding to the keyboard mapping test platform 702, a username, a password, or the like as inputs. In these instances, the keyboard mapping test platform 702 may generate a script that, when implemented, may cause the keyboard mapping test platform 702 to cause output of ICA values corresponding to the key input scenarios in the keyboard mapping table.

At step 804, the keyboard mapping test platform 702 may initiate the keyboard mapping test automation script generated at step 803. By initiating the keyboard mapping test automation script, the keyboard mapping test platform 702 may cause performance of steps 805-816, which are described in further detail below. In one or more instances, the keyboard mapping test platform 702 may initiate the keyboard mapping test automation script in response to receiving a user input. Additionally or alternatively, the keyboard mapping test platform 702 may automatically initiate the keyboard mapping test automation script at a predetermined interval (e.g., once a month) or upon determining that new software components have been installed (e.g., a Japanese keyboard is installed).

At step 805, the keyboard mapping test platform 702 may create a test environment. In one or more instances, in creating the test environment, the keyboard mapping test platform 702 may cause installation of the one or more inputs received at step 802. For example, the keyboard mapping test platform 702 may install any operating systems, browsers, keyboards, or the like indicated by the one or more inputs. In instances where the inputs received at step 802 are information corresponding to software components (rather than the software components themselves), the keyboard mapping test platform 702 may download the software components indicated in the information.

At step 806, the keyboard mapping test platform 702 may continue to create the test environment by establishing a connection with the remote desktop host platform 703. In one or more instances, the keyboard mapping test platform 702 may establish a wireless data connection with the remote desktop host platform 703 to link the keyboard mapping test platform 702 to the remote desktop host platform 703. In establishing the connection with the remote desktop host platform 703, the keyboard mapping test platform 702 may establish a connection with a remote desktop host platform 703 configured to host virtual desktops that are enabled to run the one or more inputs. For example, the remote desktop host platform 703 may be configured to host a virtual desktop enabled to run the same operating systems, browsers, keyboards, or the like as the keyboard mapping test platform 702 and/or a local client device. In one or more instances, the keyboard mapping test platform 702 may establish the connection with the remote desktop host platform 703 using a remote desktop protocol (RDP).

At step 807, the keyboard mapping test platform 702 may generate and send one or more commands directing the remote desktop host platform 703 to simulate a keyboard input received at the platform 702. In one or more instances, in sending the one or more commands, the keyboard mapping test platform 702 may send an ICA value corresponding to a keyboard input to the remote desktop host platform 703. In one or more instances, the keyboard mapping test platform 702 may send the one or more commands directing the remote desktop host platform 703 to simulate the keyboard input received at the platform 702 via the communication interface 713 and while the wireless data connection is established. In one or more instances, the one or more commands directing the remote desktop host platform 703 to simulate the keyboard input may direct the remote desktop host platform 703 to simulate a keyboard input from the keyboard mapping table that has not yet been simulated. For example, the keyboard mapping table may contain multiple keyboard inputs (e.g., a, b, c, or the like). After simulating a first keyboard input (e.g, a), the keyboard mapping test platform 702 may send one or more commands directing the remote desktop host platform 703 to simulate a second keyboard input (e.g., b) that has not yet been simulated. In some instances, the keyboard mapping test platform 702 may send one or more commands directing the remote desktop host platform 703 to simulate a multiple key command (e.g., ctrl+v, or the like). In these instances, the keyboard mapping test platform 702 may send the one or more commands to the remote desktop host platform 703 in response to determining that a first key (e.g., ctrl) is being held down when a second key (e.g., v) is pressed.

At step 808, the remote desktop host platform 703 may receive the one or more commands directing the remote desktop host platform 703 to simulate the keyboard input received at the keyboard mapping test platform 702. In one or more instances, the remote desktop host platform 703 may receive the one or more commands directing the remote desktop host platform 703 to simulate the keyboard input while the wireless data connection is established. In these instances, the remote desktop host platform 703 may receive an ICA value and may perform a lookup function determine a key corresponding to the ICA value using a locally stored copy of the keyboard mapping table.

At step 809, the keyboard mapping test platform 702 and the remote desktop host platform 703 may simulate the keyboard input. In some instances, by simulating the keyboard input, the keyboard mapping test platform 702 and the remote desktop host platform 703 may each cause display or otherwise process an output corresponding to the keyboard input. In simulating the keyboard input, the keyboard mapping test platform 702 may use a test program (e.g., a text editor) at the keyboard mapping test platform 702 to simulate a particular key, key combination, key command, or the like specified by the keyboard input and to generate an output. For example, the keyboard mapping test platform 702 may simulate the keyboard input corresponding to the letter "a" key resulting in an output of "a" at the keyboard mapping test platform 702.

In simulating the keyboard input, the remote desktop host platform 703 may simulate the same key, key combination, key command or the like as simulated by the keyboard mapping test platform 702 (e.g., based on the ICA value received at step 808) using a test program (e.g., a text editor) at the remote desktop host platform 703 to cause output at the keyboard mapping test platform 702 or another local computing device via a virtual desktop interface. For example, the remote desktop host platform 703 may also simulate the keyboard input corresponding to the letter "a" key, and may generate an output based on the simulation.

At step 810, the keyboard mapping test platform 702 may output a local display and a virtual desktop interface each of which may include a keyboard simulation output. These keyboard simulation outputs may be generated by the simulations of the keyboard input at the keyboard mapping test platform 702 and the remote desktop host platform 703 respectively at step 809. For example, if the keyboard input corresponds to the letter "a" key, the keyboard mapping test platform 702 may cause a keyboard simulation output corresponding to input from the letter "a" key to be displayed in the text editor (e.g., the keyboard mapping test platform 702 may display the letter "a" in the text editor). In outputting the keyboard simulation output, the keyboard mapping test platform 702 may display a graphical user interface similar to graphical user interface 1005, which is shown in FIG. 10A. In some instances, the keyboard simulation output by the keyboard mapping test platform 702 may be presumed correct because it is a local machine output. Although FIG. 10A depicts a single keyboard simulation output on each of the local desktop and virtual desktop, it should be understood that the local desktop and virtual desktop may display multiple keyboard simulation outputs at once (e.g., if a word or phrase was typed as the keyboard input).

Figures 11A, 11B:
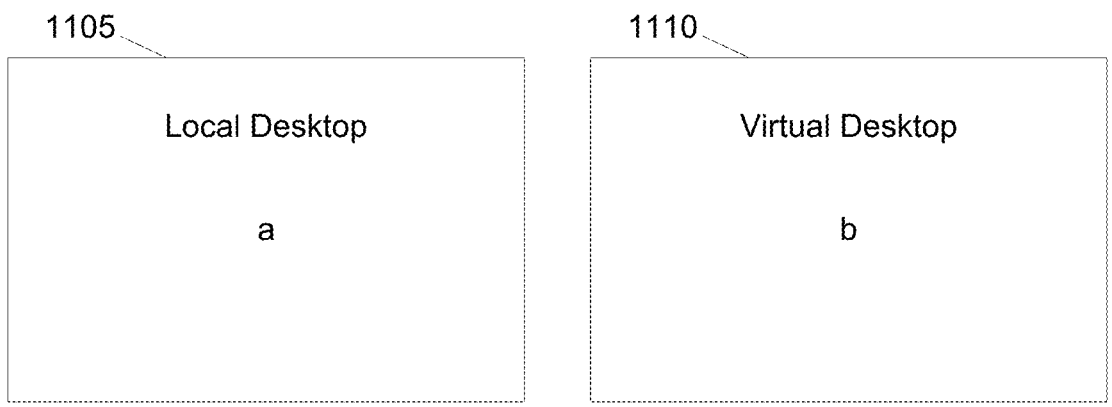
FIGS. 11A-11B depict graphical user interfaces and a corresponding keyboard mapping table associated with performance of automated keyboard mapping for virtual desktops.

Similarly, the remote desktop host platform 703 may cause a keyboard simulation output corresponding to the keyboard input to be displayed at the keyboard mapping test platform 702 via a virtual desktop interface. If the keyboard mapping table stored by the remote desktop host platform 703 is correct, then the keyboard simulation output at the remote desktop host platform 703 should match the keyboard simulation output at the keyboard mapping test platform 702 (e.g., the virtual desktop interface should also display the letter "a"). In outputting the simulated keyboard input, the keyboard mapping test platform 702 may display a graphical user interface similar to graphical user interface 1010, which is shown in FIG. 10A. However, this might not always be the case. For example, in some instances, the remote desktop host platform 703 may incorrectly map the keyboard input, and may cause output of an incorrect character or command at the virtual desktop. This is shown in graphical user interfaces 1105 and 1110 which are depicted in FIG. 11A. For example, the local keyboard simulation output shown by graphical user interface 1105 is the letter "a," whereas the virtual desktop keyboard simulation output shown by the graphical user interface 1110 is the letter "b." In these instances, the keyboard simulation output by the keyboard mapping test platform 702 may be presumed correct because it is a local machine output.

In one or more instances, the keyboard mapping test platform 702 may cause display of the local and virtual desktop keyboard simulation outputs simultaneously. In other instances, the keyboard mapping test platform 702 may cause display of the local and virtual desktop keyboard simulation outputs at separate times.

At step 811, the keyboard mapping test platform 702 may capture screenshots of the local and virtual desktop keyboard simulation outputs. In capturing the screenshots, the keyboard mapping test platform 702 may capture screenshots of graphical user interfaces similar to graphical user interfaces 1005 and 1010 shown in FIG. 10A or 1105 and 1110 shown in FIG. 10B.

Referring to FIG. 8B, at step 812, the keyboard mapping test platform 702 may compare the screenshots captured at step 812. In comparing the screen shots, the keyboard mapping test platform 702 may perform text recognition on the screenshots, and compare the local and virtual desktop keyboard simulation outputs. In comparing the screenshots, the keyboard mapping test platform 702 may determine whether the remote desktop host platform 703 mapped the keyboard input to the same keyboard simulation output as the keyboard mapping test platform 702. In comparing the screenshots, the keyboard mapping test platform 702 may determine that it's local keyboard mapping table is correct, whereas a keyboard mapping table stored by the remote desktop host platform 703 is incorrect. In one or more instances, the keyboard mapping test platform 702 may compare a local keyboard mapping table with a keyboard mapping table stored at the remote desktop host platform 703.

At step 813, the keyboard mapping test platform 702 may either mark or record the ICA value output by the remote desktop host platform 703. If, at step 812, the keyboard mapping test platform 702 determined that the screenshots contained matching keyboard simulation outputs, the keyboard mapping test platform 702 may record the ICA value output by the remote desktop host platform 703 in the keyboard mapping table. For example, the keyboard mapping test platform 702 may fill in the keyboard mapping table 1015 to include an ICA value of 97 after determining that the graphical user interfaces 1005 and 1010, corresponding to the local desktop and the virtual desktop respectively, match (e.g., the key input was "a" and both interfaces display "a."

If the keyboard mapping test platform 702 determined that the screenshots did not contain matching keyboard simulation outputs, the keyboard mapping test platform 702 may indicate an error in the keyboard mapping table. For example, the keyboard mapping test platform 702 may fill in the ICA value as shown in keyboard mapping table 1115, shown in FIG. 11B. Rather than including the ICA value that was output, the keyboard mapping test platform 702 may mark the ICA value as "error," after determining (as depicted by graphical user interfaces 1105 and 1110 in FIG. 11A) that the keyboard simulation outputs by the keyboard mapping test platform 702 and the remote desktop host platform 703 do not match (e.g., the key input was "a," the local desktop outputs "a," but the virtual desktop outputs "b." In some instances, rather than marking the ICA value as error, the keyboard mapping test platform 702 may leave the ICA value in the keyboard mapping table blank.

At step 814, after updating the keyboard mapping table, the keyboard mapping test platform 702 may reset the test environment to test a new keyboard input. In one or more instances, in resetting the test environment, the keyboard mapping test platform 702 may reset the keyboard input (e.g., prepare the keyboard mapping test platform 702 to test a new keyboard input such as "b"). For example, the keyboard mapping test platform 702 may reset the test environment from a keyboard input of "a" so that a keyboard input of "b" may be tested (e.g., the keyboard mapping test platform 702 may proceed to simulate a subsequent row of the keyboard mapping table). In these instances, the keyboard mapping test platform 702 may reset a portion of the test environment (e.g., may leave the operating system, keyboard, or the like the same).

At step 815, the keyboard mapping test platform 702 may determine whether all of the keyboard inputs included in the keyboard mapping table have been tested. For example, the keyboard mapping test platform 702 may proceed linearly through the keyboard mapping table to test each entry. Once the keyboard mapping test platform 702 proceeds through the entire keyboard mapping table, the keyboard mapping test platform 702 may determine that all keyboard inputs in the keyboard mapping table have been tested. In one or more instances, the keyboard mapping test platform 702 may determine whether an entry in the keyboard mapping test platform 702 has been simulated based on a determination that an ICA value or an error value is present for the entry. If not, the keyboard mapping test platform 702 may return to step 809 to simulate the additional keyboard input. If all of the keyboard inputs included in the keyboard mapping table have been tested, the keyboard mapping test platform may proceed to step 816.

At step 816, the keyboard mapping test platform 702 may delete the testing environment. In one or more instances, in deleting the testing environment, the keyboard mapping test platform 702 may terminate the connection to the virtual desktop hosted by the remote desktop host platform.

At step 817, the keyboard mapping test platform 702 may update the ICA value in the keyboard mapping table for any keyboard inputs marked incorrect at step 813. If the keyboard mapping test platform 702 determines that the value of the key input is defined in ICA protocol (e.g., stored in an ICA protocol database), then the keyboard mapping test platform 702 may read the correct value and update it in the keyboard mapping table. In some instances, the updates may occur one by one. In other instances, the updates may occur as a single batch update. If the keyboard mapping test platform 702 determines that the key value is not defined in ICA protocol, the keyboard mapping test platform 702 may define the key value in ICA protocol (e.g., assign an ICA value in the ICA protocol database) and update both the ICA protocol and the keyboard mapping table.

At step 818, the keyboard mapping test platform 702 may store the updated keyboard mapping table. In one or more instances, in storing the updated keyboard mapping table, the keyboard mapping test platform 702 may overwrite an existing keyboard mapping table. In other instances, the keyboard mapping test platform 702 may delete an existing keyboard mapping table and save a new one. In one or more instances, the keyboard mapping test platform 702 may store the updated keyboard mapping table in the keyboard mapping test database 712b. As a result, if the keyboard mapping test platform 702 accesses a subsequent virtual desktop hosted by the remote desktop host platform 703, the keyboard mapping will be correct where it was previously incorrect. Accordingly, upon receiving an actual keyboard input, the system may apply the corrected keyboard mapping table.

As described above, it should be understood that although steps 801-818 are described primarily with regard to a keyboard input corresponding to a single key, (e.g. "a"), the method described herein also applies to commands associated with keystrokes (e.g., ctrl+c, ctrl+v, or the like).

Subsequently, the event sequence may end, and the keyboard mapping test platform 702 may continue to access virtual desktops and cause keyboard simulation outputs at the virtual desktops corresponding to keyboard inputs. Additionally, the keyboard mapping test platform may test keyboard inputs under new or varied testing conditions (e.g., change the operating system, browser, and keyboard combinations and verify the corresponding keyboard mappings). Accordingly, an automatic way to determine all incorrect keyboard mappings for a plurality of test scenarios is determined. Additionally, rather than modifying code corresponding to an error value, merely a keyboard mapping table may be maintained. Accordingly, the difficulty and time commitment corresponding to adjusting an error value may be reduced.

Figure 9:
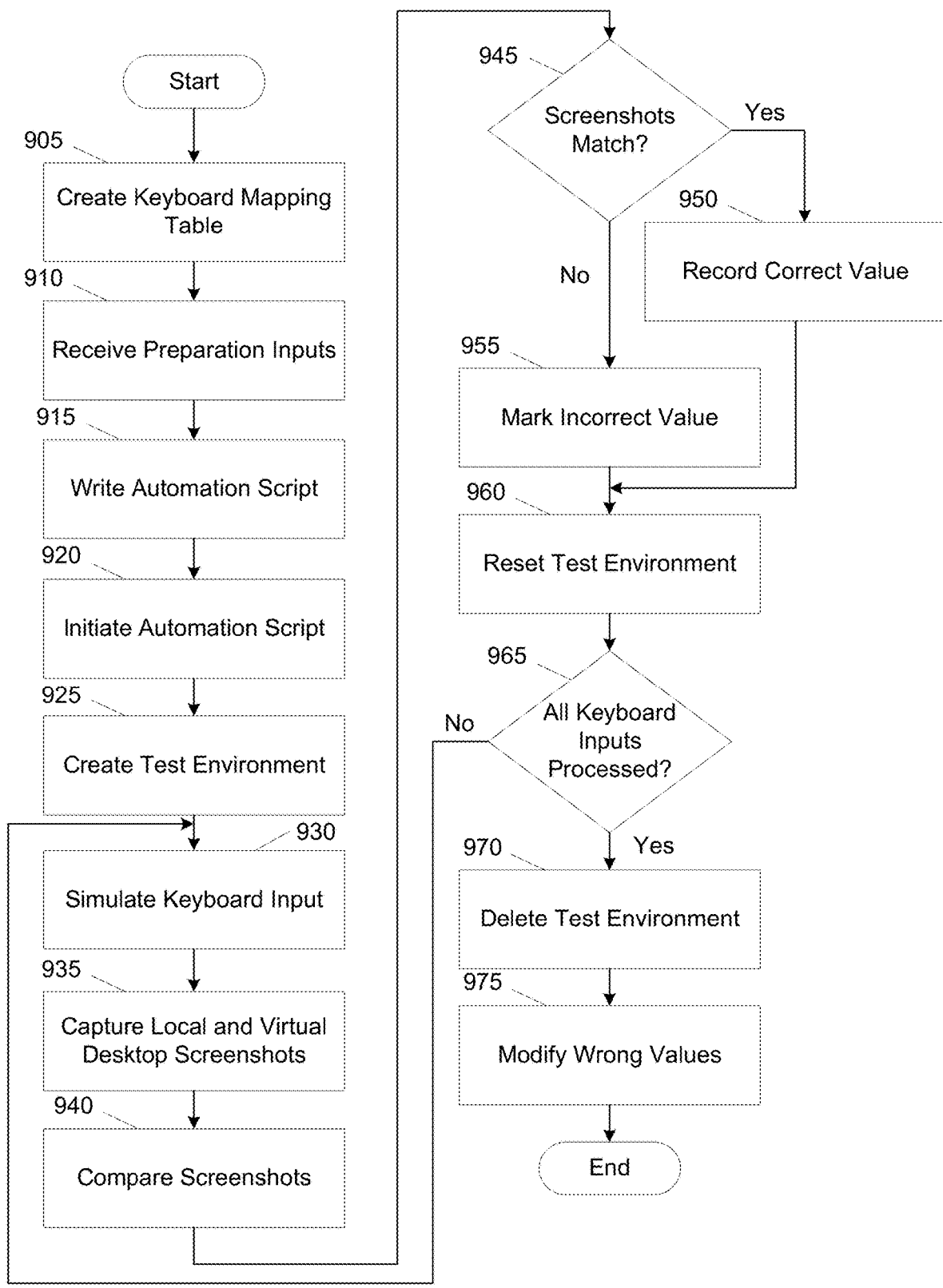
FIG. 9 depicts an illustrative method for performing automated keyboard mapping for virtual desktops in accordance with one or more example embodiments.

FIG. 9 depicts an illustrative method for performing automated keyboard mapping for virtual desktops in accordance with one or more example embodiments. Referring to FIG. 9, at step 905, a computing device having at least one processor, a communication interface, and memory may create a keyboard mapping table. Actions performed at step 905 may be similar to those described above with regard to step 801. At step 910, the computing device may receive one or more inputs. Actions performed at step 910 may be similar to those described above with regard to step 802. At step 915, the computing device may write a keyboard mapping test automation script to automatically test keyboard mapping at a virtual desktop. Actions performed at step 915 may be similar to those described above with regard to step 803. At step 920, the computing device may initiate the keyboard mapping test automation script generated at step 915. Actions performed at step 920 may be similar to those described above with regard to step 904. At step 925, the computing device may create a test environment to test one or more keyboard inputs. Actions performed at step 925 may be similar to those described above with regard to step 805. At step 930, the computing device may simulate a keyboard input in the test environment by running the keyboard mapping test automation script. By simulating the keyboard input, the computing device may generate an output corresponding to the keyboard input. Actions performed at step 930 may be similar to those described above with regard to step 809-810. At step 935, the computing device may capture screenshots of a local and a virtual desktop displayed on a display of the computing device. Actions performed at step 935 may be similar to those described above with regard to step 811. At step 940, the computing device may compare the screenshot captured at step 935. Actions performed at step 940 may be similar to those described above with regard to step 812. At step 945, the computing device may determine whether the outputs in each screenshot match. If the computing device determines that the outputs do match, the computing device may proceed to step 950. If the computing device determines that the outputs do not match, the computing device may proceed to step 955.

At step 950, the computing device may record the correct ICA value in the keyboard mapping table. At step 955, the computing device may mark an incorrect value in the keyboard mapping table. Actions performed at steps 950-955 may be similar to those described above with regard to step 813. At step 960, the computing device may reset the test environment to prepare the test environment to simulate a new keyboard input. Actions performed at step 960 may be similar to those described above with regard to step 814. At step 965, the computing device may determine whether all keyboard inputs in the keyboard mapping table have been processed. If some keyboard inputs in the keyboard mapping table have not been processed, the computing device may return to step 930. If all keyboard inputs have been processed, the computing device may proceed to step 970. Actions performed at step 965 may be similar to those described above with regard to step 815.

At step 970, the computing device may delete the test environment. Actions performed at step 970 may be similar to those described above with regard to step 816. At step 975, the computing device may correct the ICA values corresponding to the error outputs marked at step 955, and may store the updated keyboard mapping table. Actions performed at step 975 may be similar to those described above with regard to steps 817-818.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A system comprising:
   at least one processor; and
   a memory storing computer readable instructions that, when executed by the at least one processor, cause the system to:
      simulate a first keyboard input by generating, using a script and in response to entry of an input from a keyboard, outputs, wherein:
         the outputs simulate, both locally and at a virtual desktop hosted by a remote desktop platform, the input from the keyboard, and
         the script is configured to capture screenshots of the system and the virtual desktop that contain the outputs;
      in response to determining a discrepancy between the outputs, modify a stored value corresponding to the first keyboard input; and
      in response to receipt of a second keyboard input by the system, initiate display, based on the modified stored value and at the virtual desktop hosted by the remote desktop platform, of a keyboard simulation output having the same key value as the first keyboard input.

2. The system of claim 1, further comprising generating a keyboard mapping table containing a plurality of inputs, including the first keyboard input and the second keyboard input, and corresponding values indicative of the input, including the value indicative of the first keyboard input.

3. The system of claim 2, wherein modifying the stored value comprises modifying one of the corresponding values indicative of the first keyboard input included in the keyboard mapping table.

4. The system of claim 3, wherein modifying the stored value results in a corrected keyboard mapping table.

5. The system of claim 4, wherein initiating display of the keyboard simulation output further comprises applying the corrected keyboard mapping table.

6. The system of claim 1, wherein the outputs comprise keyboard simulation outputs.

7. The system of claim 1, wherein the computer readable instructions, when executed by the at least one processor, further cause the system to:
   compare the outputs simulated locally and at the virtual desktop hosted by the remote desktop platform; and
   determine the discrepancy between the outputs.

8. The system of claim 1, wherein the first keyboard input and the second keyboard input have the same key value.

9. A method comprising:
   simulating a first keyboard input by generating, by a system, using a script, and in response to entry of an input from a keyboard, outputs, wherein:
      the outputs simulate, both locally and at a a virtual desktop hosted by a remote desktop platform, the input from the keyboard, and
      the script is configured to capture screenshots of the system and the virtual desktop that contain the outputs;
   in response to determining a discrepancy between the outputs, modifying a stored value corresponding to the first keyboard input; and
   in response to receipt of a second keyboard input by the system, initiating display, based on the modified stored value and at the virtual desktop hosted by the remote desktop platform, of a keyboard simulation output having the same key value as the first keyboard input.

10. The method of claim 9, further comprising generating a keyboard mapping table containing a plurality of inputs, including the first keyboard input and the second keyboard input, and corresponding values indicative of the input, including the value indicative of the first keyboard input.

11. The method of claim 10, wherein modifying the stored value comprises modifying one of the corresponding values indicative of the first keyboard input included in the keyboard mapping table.

12. The method of claim 11, wherein modifying the stored value results in a corrected keyboard mapping table.

13. The method of claim 12, wherein initiating display of the keyboard simulation output further comprises applying the corrected keyboard mapping table.

14. The method of claim 9, wherein the outputs comprise keyboard simulation outputs.

15. The method of claim 9, further comprising:
   comparing the outputs simulated locally and at the virtual desktop hosted by the remote desktop platform; and
   determine the discrepancy between outputs.

16. The method of claim 9, wherein the first keyboard input and the second keyboard input have the same key value.

17. One or more non-transitory computer-readable media storing instructions that, when executed by a system comprising at least one processor, a communication interface, and memory, cause the system to:
   simulate a first keyboard input by generating, using a script and in response to entry of an input from a keyboard, outputs, wherein:
      the outputs simulate, both locally and at a virtual desktop hosted by a remote desktop platform, the input from the keyboard, and
      the script is configured to capture screenshots of the system and the virtual desktop that contain the outputs;
   in response to determining a discrepancy between the outputs, modify a stored value corresponding to the first keyboard input; and
   in response to receipt of a second keyboard input by the system, initiate display, based on the modified stored value and at the virtual desktop hosted by the remote desktop platform, of a keyboard simulation output having the same key value as the first keyboard input.

18. The one or more non-transitory computer-readable media of claim 17, further comprising generating a keyboard mapping table containing a plurality of inputs, including the first keyboard input and the second keyboard input, and corresponding values indicative of the input, including the value indicative of the first keyboard input.

19. The one or more non-transitory computer-readable media of claim 18, wherein modifying the stored value comprises modifying one of the corresponding values indicative of the first keyboard input included in the keyboard mapping table.

20. The one or more non-transitory computer-readable media of claim 19, wherein modifying the stored value results in a corrected keyboard mapping table.

* * * * *